(12) United States Patent
Barnard

(10) Patent No.: US 9,793,745 B2
(45) Date of Patent: Oct. 17, 2017

(54) ELECTRONIC DEVICE CHARGING STATION

(71) Applicant: Brandon Barnard, Evansville, IN (US)

(72) Inventor: Brandon Barnard, Evansville, IN (US)

( * ) Notice: Subject to any disclaimer, the term of this patent is extended or adjusted under 35 U.S.C. 154(b) by 119 days.

(21) Appl. No.: 14/979,989

(22) Filed: Dec. 28, 2015

(65) Prior Publication Data
US 2016/0315496 A1     Oct. 27, 2016

Related U.S. Application Data

(60) Provisional application No. 62/098,462, filed on Dec. 31, 2014.

(51) Int. Cl.
| | | |
|---|---|---|
| *H01M 10/46* | (2006.01) | |
| *H02J 7/02* | (2016.01) | |
| *H02J 7/00* | (2006.01) | |
| *H02J 50/10* | (2016.01) | |

(52) U.S. Cl.
CPC ............ *H02J 7/025* (2013.01); *H02J 7/0044* (2013.01); *H02J 50/10* (2016.02)

(58) Field of Classification Search
CPC .. H02J 7/025; H02J 5/005; H02J 7/355; H02J 7/0042
USPC .................. 320/107, 108, 114, 115
See application file for complete search history.

(56) References Cited

U.S. PATENT DOCUMENTS

| | | | |
|---|---|---|---|
| 2014/0232328 A1* | 8/2014 | Pegg | G04C 10/00 320/108 |
| 2016/0276865 A1* | 9/2016 | Pike | B60R 11/0241 |

* cited by examiner

*Primary Examiner* — Edward Tso
(74) *Attorney, Agent, or Firm* — Gary K. Price

(57) ABSTRACT

An inductive charging station that induces an electric current in an electronic device thereby charging the electronic device. The inductive charging station generally includes a base, a vertical portion, and a top member. The base includes a charging module in electrical communication with a transmitter part disposed in the top member such that when the electronic device's receiver is in communication with the transmitter part, the receiver is in electrical communication with the system's charging module, thereby charging the electronic device. The top member defines a first member in pivotal communication within a bore disposed in a second member. In application, the second member is configured to pivot through a 360-degree angle such that the electronic device can be rotatably positioned with the second member.

12 Claims, 13 Drawing Sheets

ELECTRONIC DEVICE CHARGING STATION

CROSS REFERENCES TO RELATED APPLICATIONS

U.S. Provisional Application for Patent No. 62/098,462, filed Dec. 31, 2014, with title "Induction Charging Station" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

The present invention is generally related to inductive charging and the transfer of wireless power, and more particularly, to a device that induces an electric current in an electronic device thereby charging the device.

2. Brief Description of Prior Art

Wireless technology used for powering and charging mobile and other electronic devices have been developed. Induction chargers typically include a transmitter that creates a magnetic field from electronic current and induces an electronic current in a receiver thereby charging the electronic device. This is the general embodiment that the present invention is intended to address.

SUMMARY OF THE INVENTION

An inductive charging station that induces an electric current in an electronic device thereby charging the electronic device. The inductive charging station includes a base, a vertical portion, and a top member. The base includes a charging module in electrical communication with a transmitter part disposed in a second portion of the top member. When the electronic device's receiver is in communication with the inductive charging station's transmitter part, the receiver is then in electrical communication with the system's charging module, thereby charging the device.

The top member generally defines a first portion and the second portion. The first portion includes a dowel that is received within a bore disposed in the second portion. The dowel is configured to be received and attached with the bore such that the second portion can be rotated about the dowel of the first portion. In application, as the second portion is rotatably positioned, the electronic device can be rotatably positioned with the second portion.

DESCRIPTION OF THE PREFERRED EMBODIMENT

Figure 1:
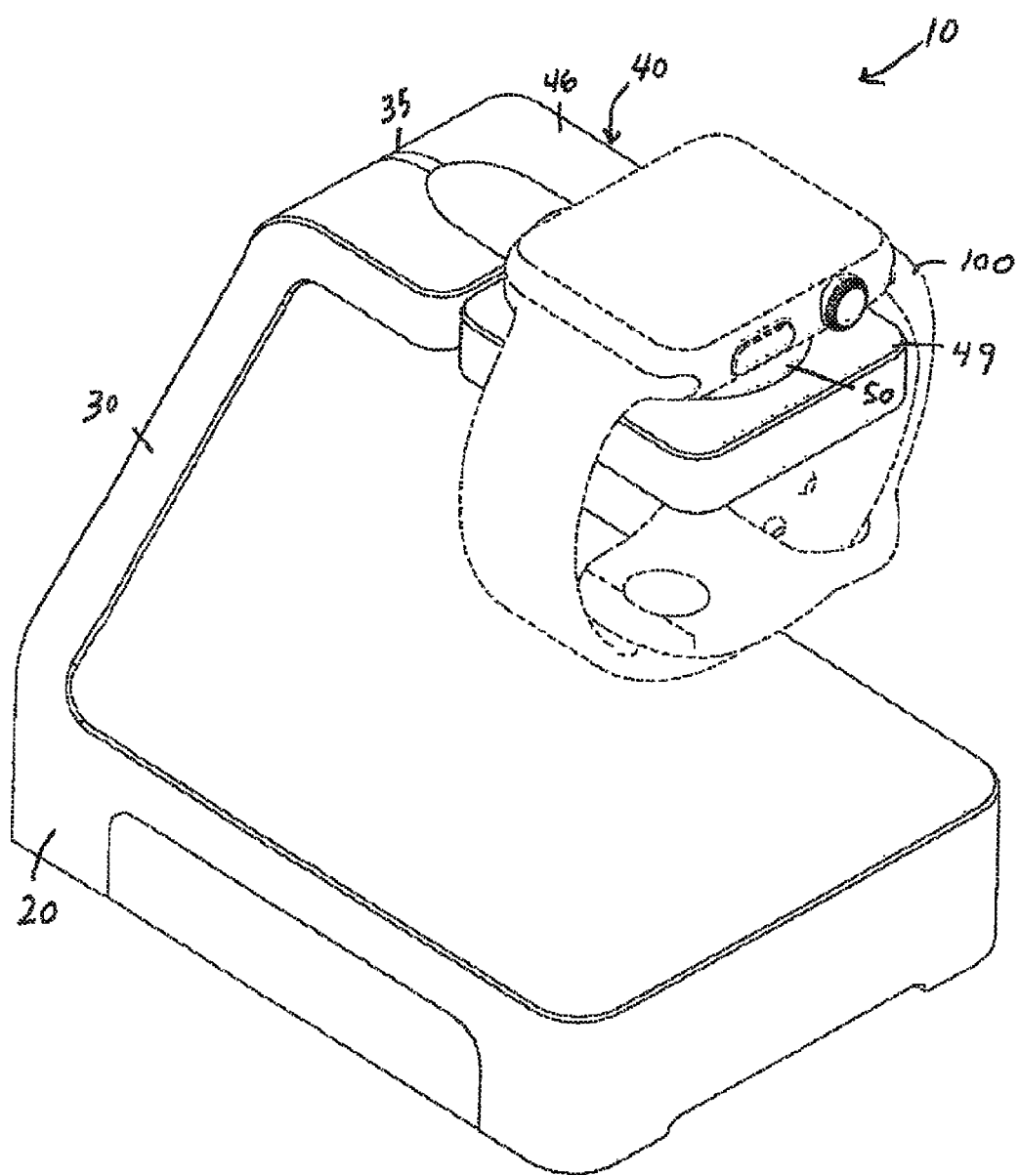
FIG. 1 is a top perspective view of the present invention, an inductive charging station, holding an electronic device which is displayed in broken lines.
Figure 2:
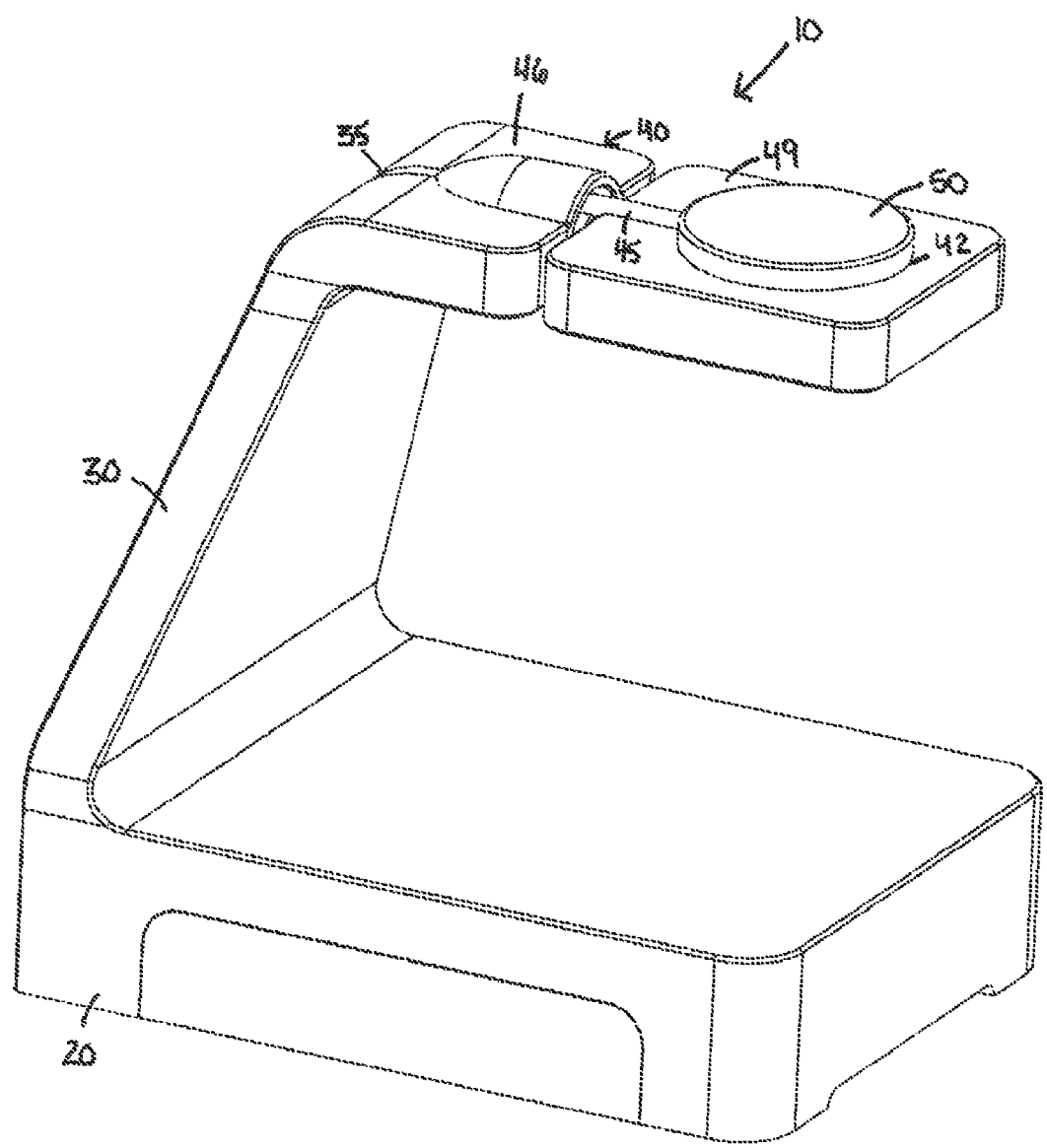
FIG. 2 is a top perspective view of the device of the present invention with a transmitter part which is displayed in broken lines.
Figure 3:
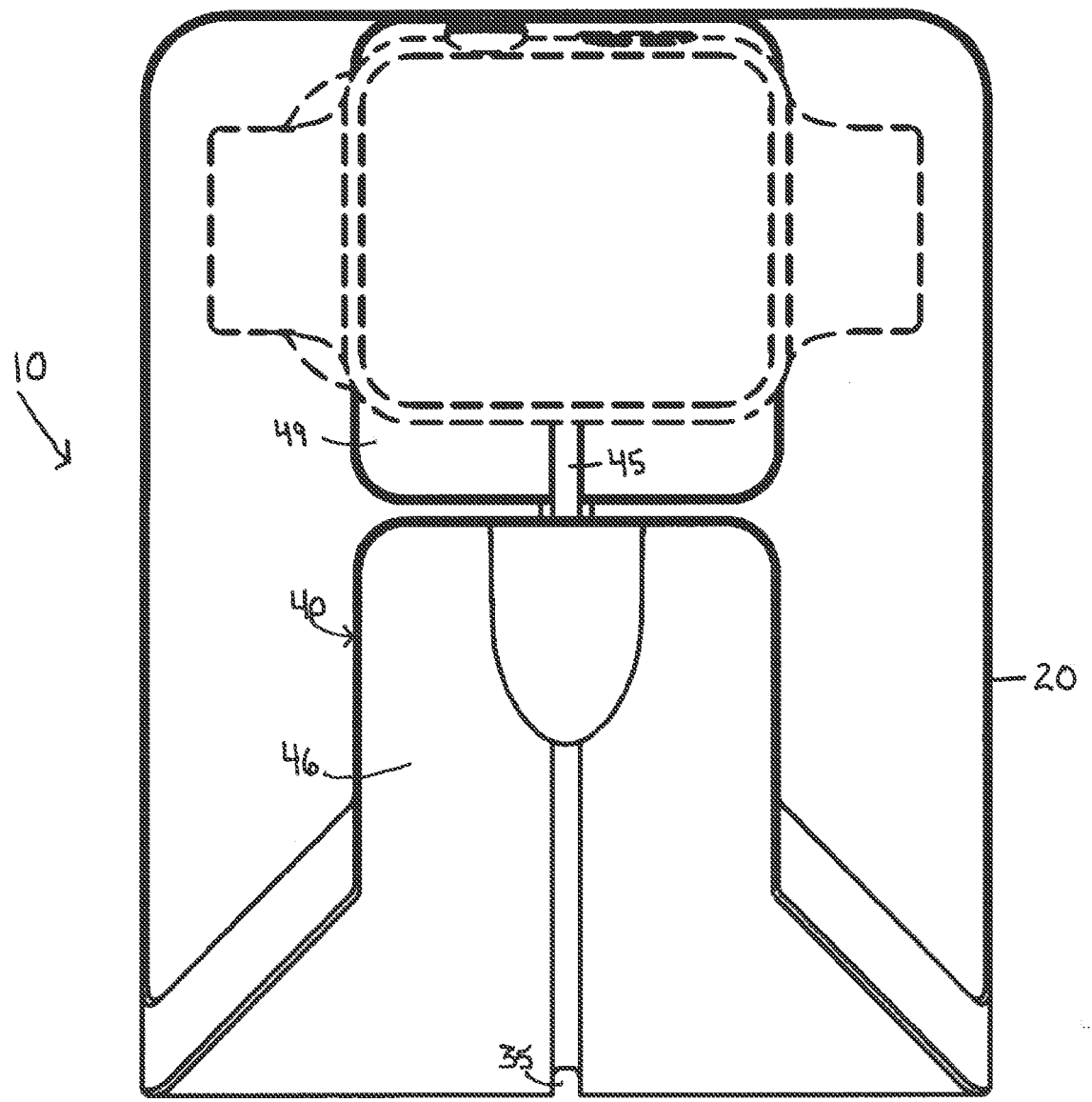
FIG. 3 is a top view of the device shown in FIG. 1.

The present invention is directed to an inductive charging or wireless charging device for use in mobile or other devices with convenient compatibility and transfer of wireless power. The present device, or power system, generally includes a transmitter that creates a magnetic field that induces an electronic current in a receiver of the electronic device, thereby charging the device. In the broadest context, the inductive charging station of the present invention consists of components configured and correlated with respect to each other so as to attain the desired objective.

With the proliferation of electrical and electronic devices (which are considered devices herein), simple and universal methods of providing power and/or charging of these devices is becoming increasingly important. Many of these devices contain internal batteries, and the device may or may not be operating during receipt of power.

Depending on the degree of charge status of the battery or its presence and the system design, the applied power may provide power to the device, charge its battery or a combination of the above. The terms charging and/or power are used interchangeably herein to indicate that the received power can be used for either of these cases or a combination thereof. Unless specifically described, these terms are therefore used interchangeably.

Referring to the drawings, FIGS. 1-6 show an inductive charging station or power system 10 according to the preferred embodiment of the present invention. The power system 10 generally including a transmitter part for connecting an electronic device 100 thereto, for charging the batteries of the electronic device 100 and/or to run the electronic device 100. As illustrated, the power system 10 according to the present embodiment supports the electronic device 100 during application. In other words, the power system 10 is an example of a supporting device, a holding device, a supporting stand, a support, a setting stand, and a holder for the electronic device 100.

Figure 4:
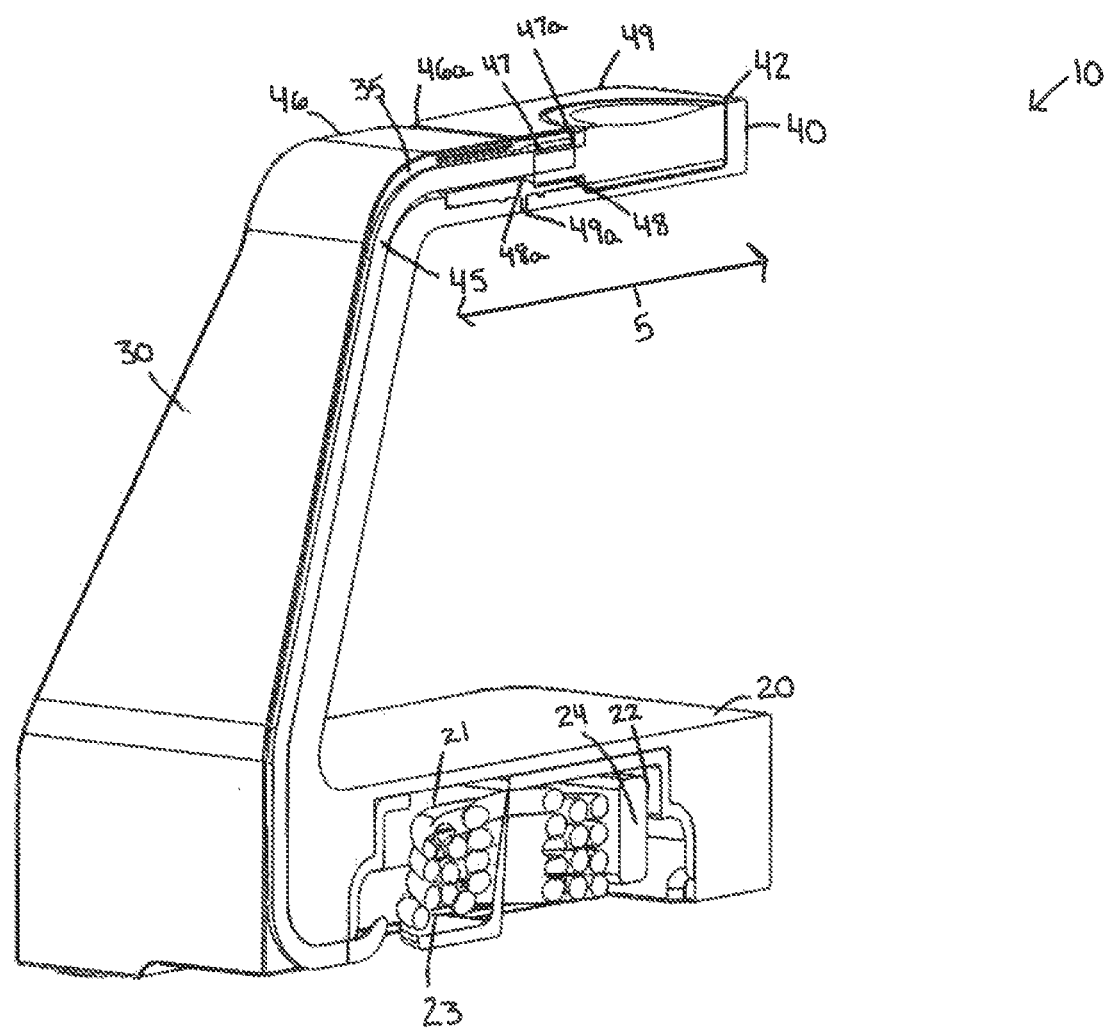
FIG. 4 is a side section view of the device illustrated in FIG. 2.
Figure 5:
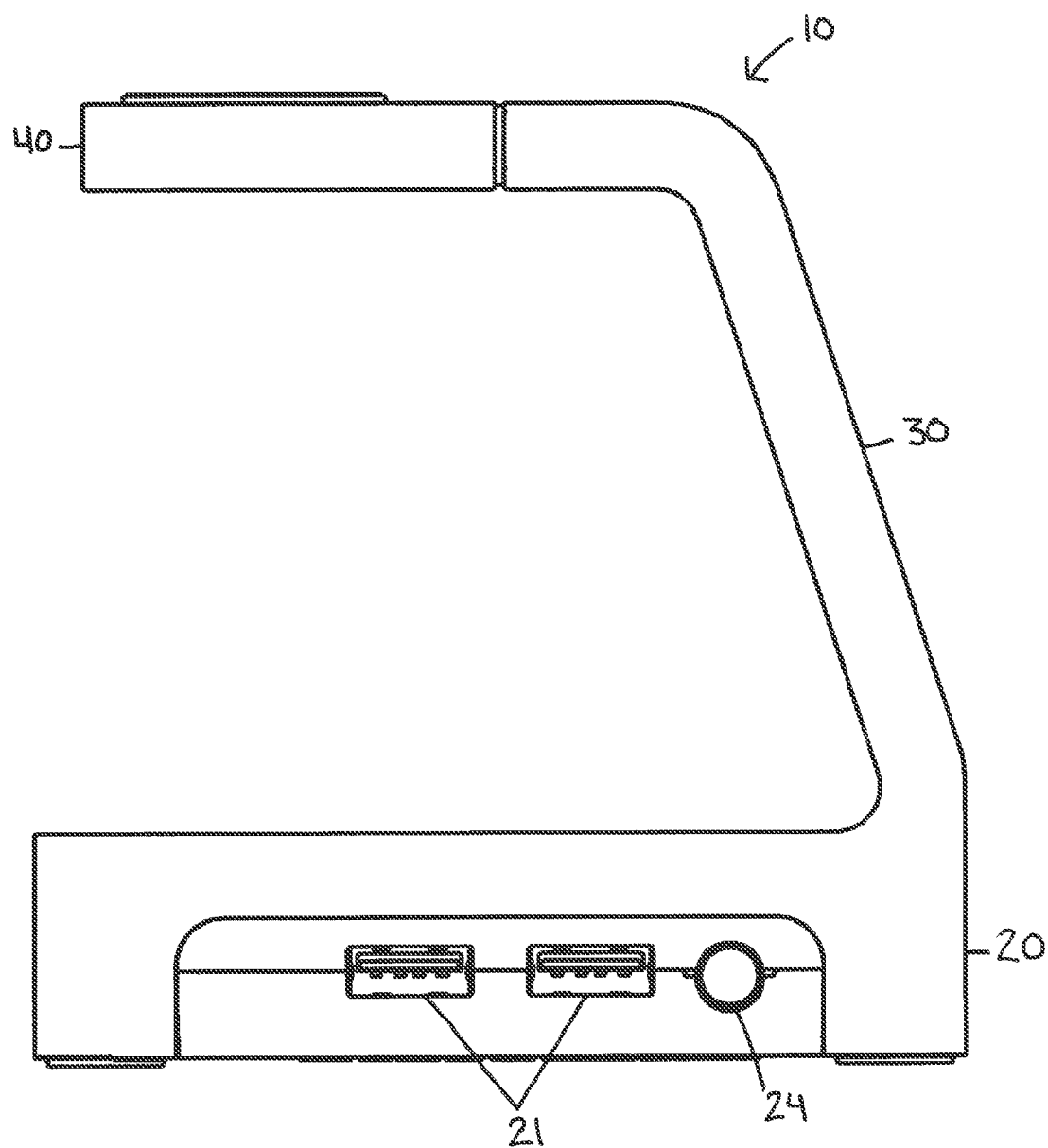
FIG. 5 is a side view of the device illustrated in FIG. 2.
Figure 6:
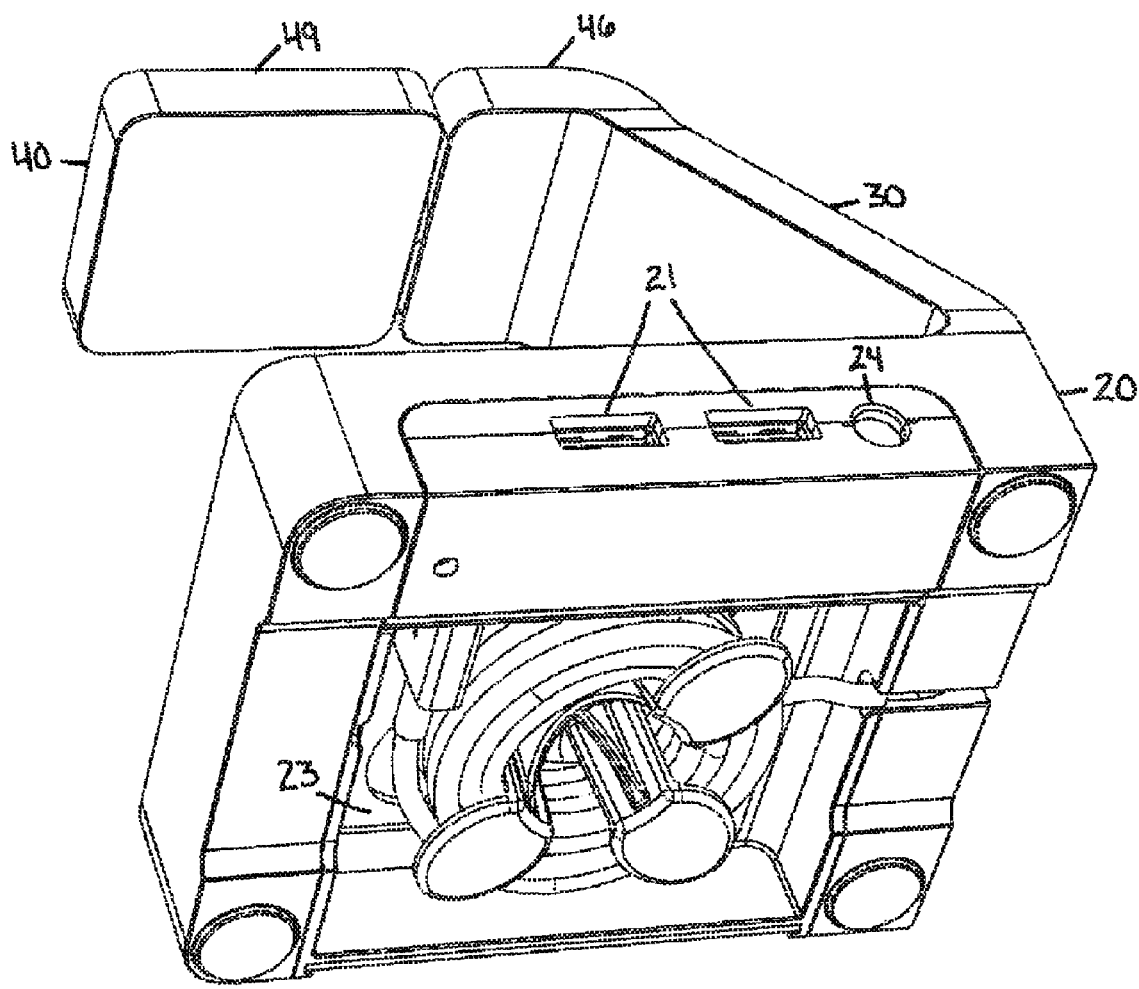
FIG. 6 is a bottom view of the device illustrated in FIG. 2.
Figure 7:
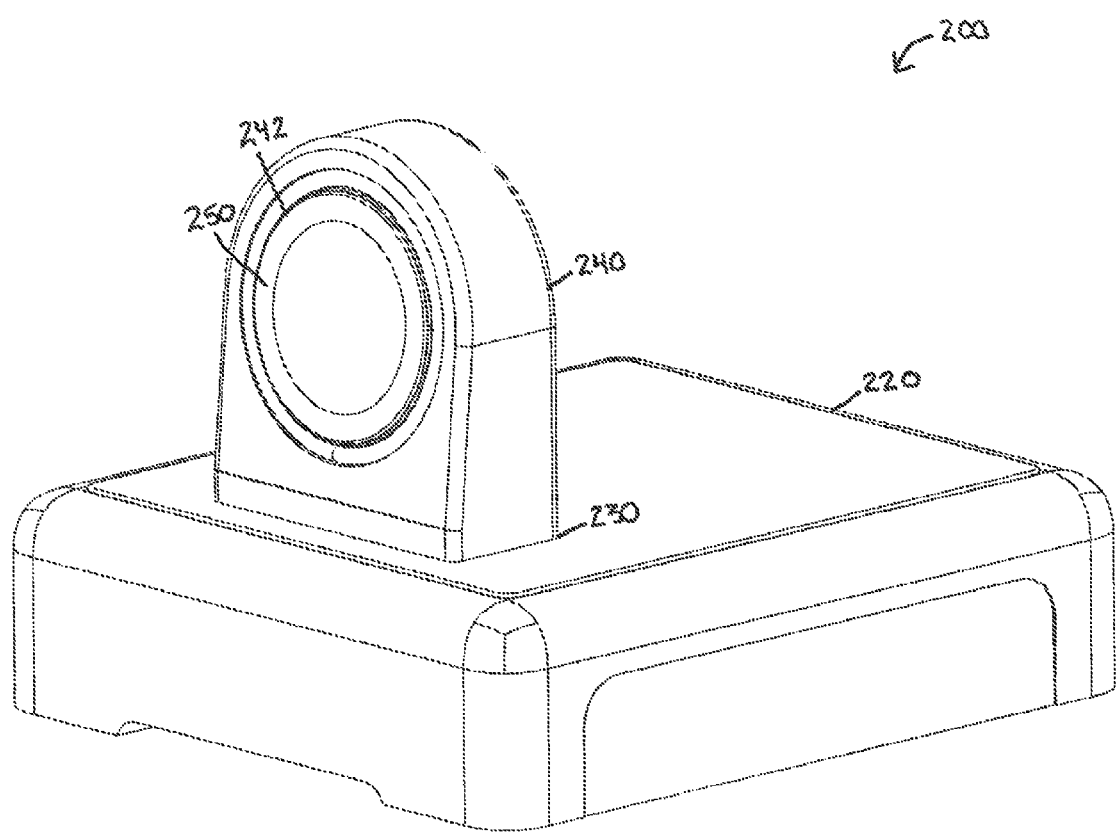
FIG. 7 is a side perspective view of an alternate embodiment of the present invention, an inductive charging station.
Figure 8:
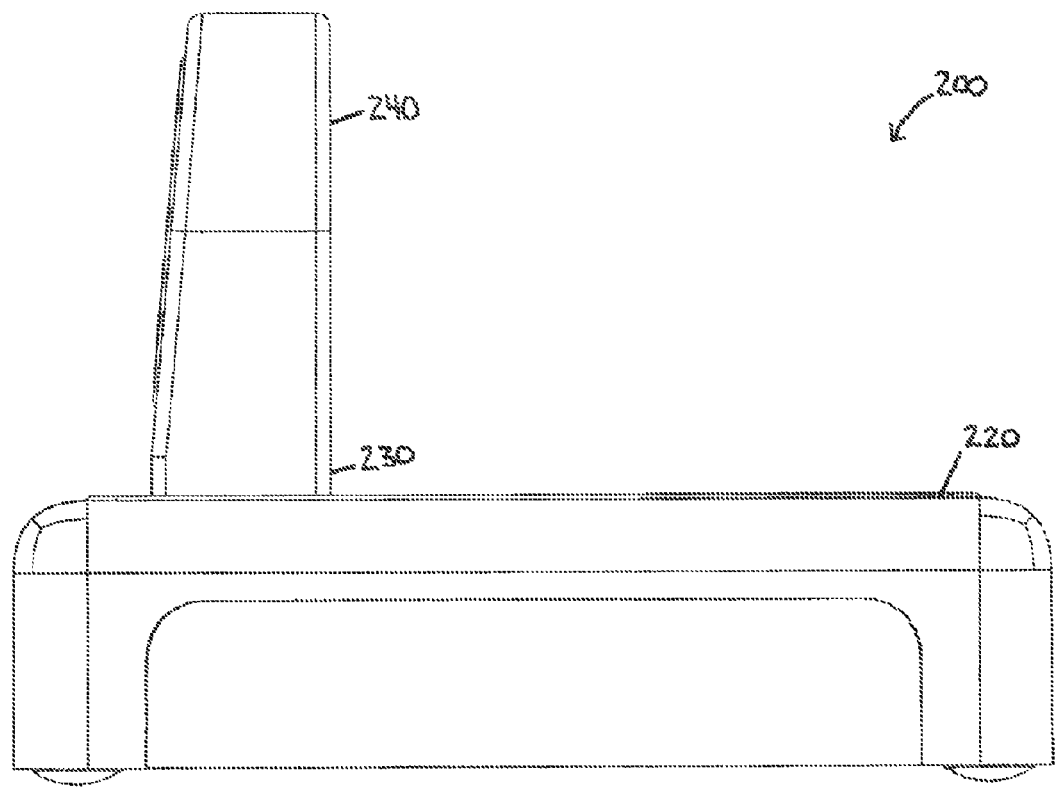
FIG. 8 is a side view of the device illustrated in FIG. 7.
Figure 9:
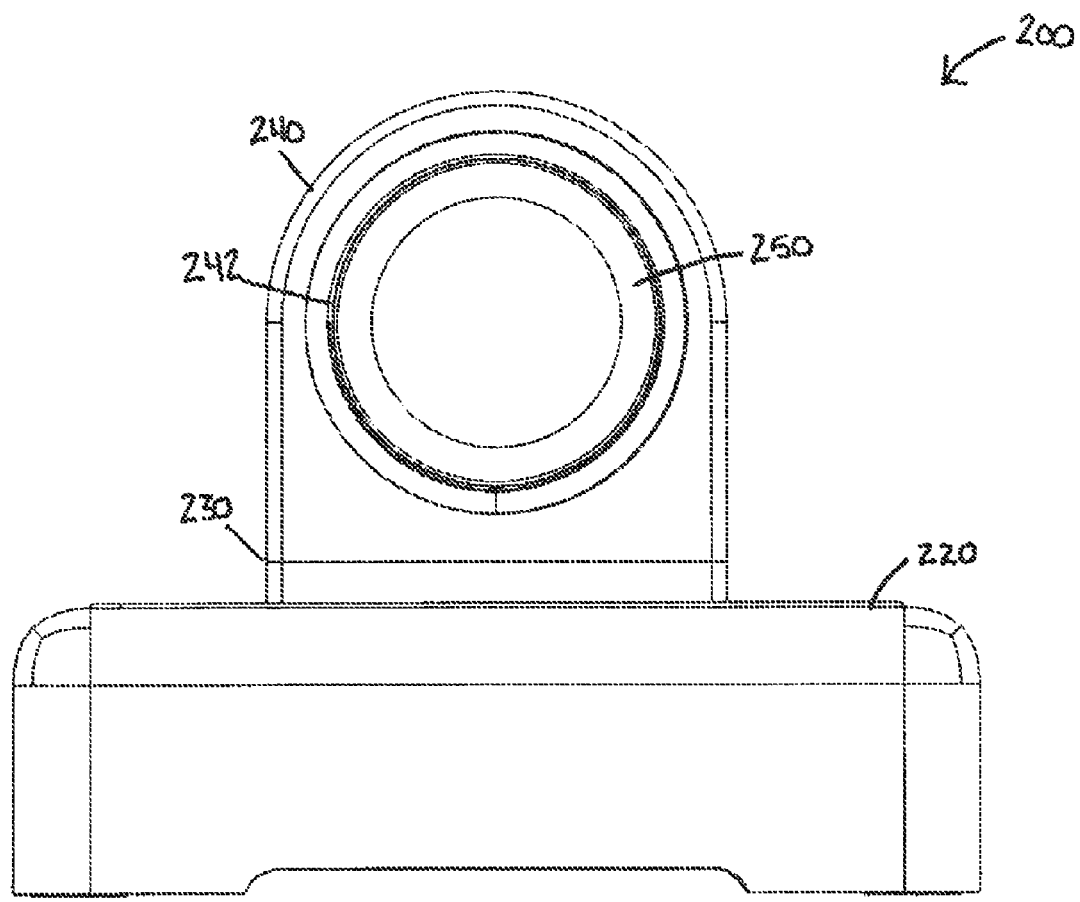
FIG. 9 is a front view of the device illustrated in FIG. 7.
Figure 10:
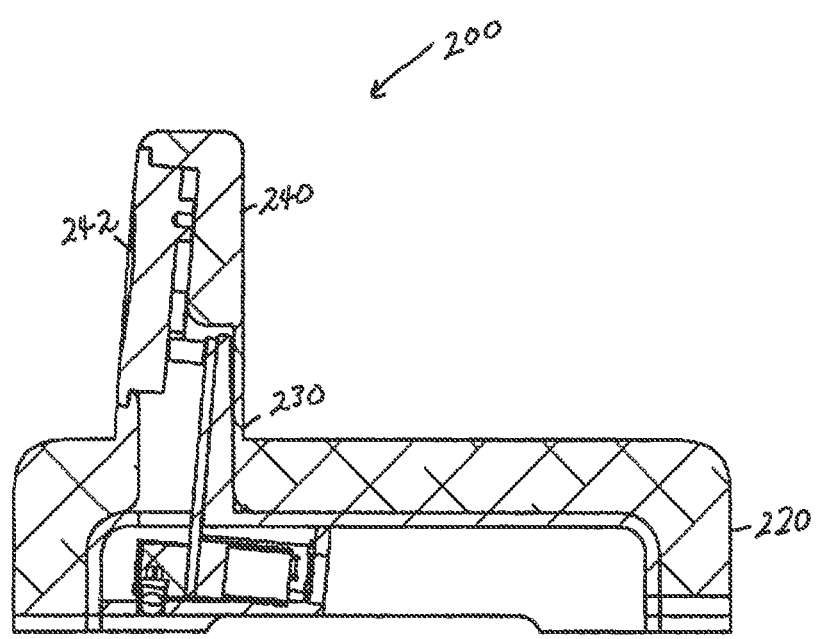
FIG. 10 is a side section view of the device illustrated in FIG. 7.
Figure 11:
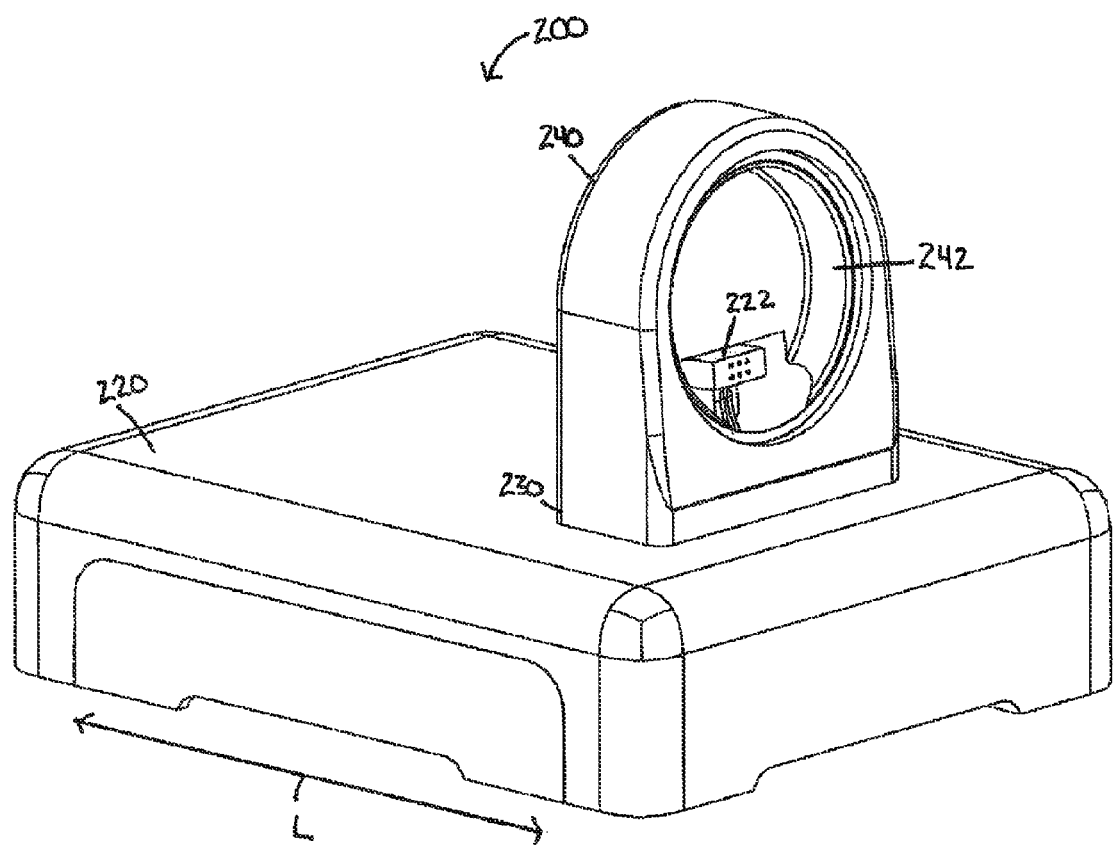
FIG. 11 is a perspective view of the device illustrated in FIG. 7 with the transmitter removed.
Figure 12:
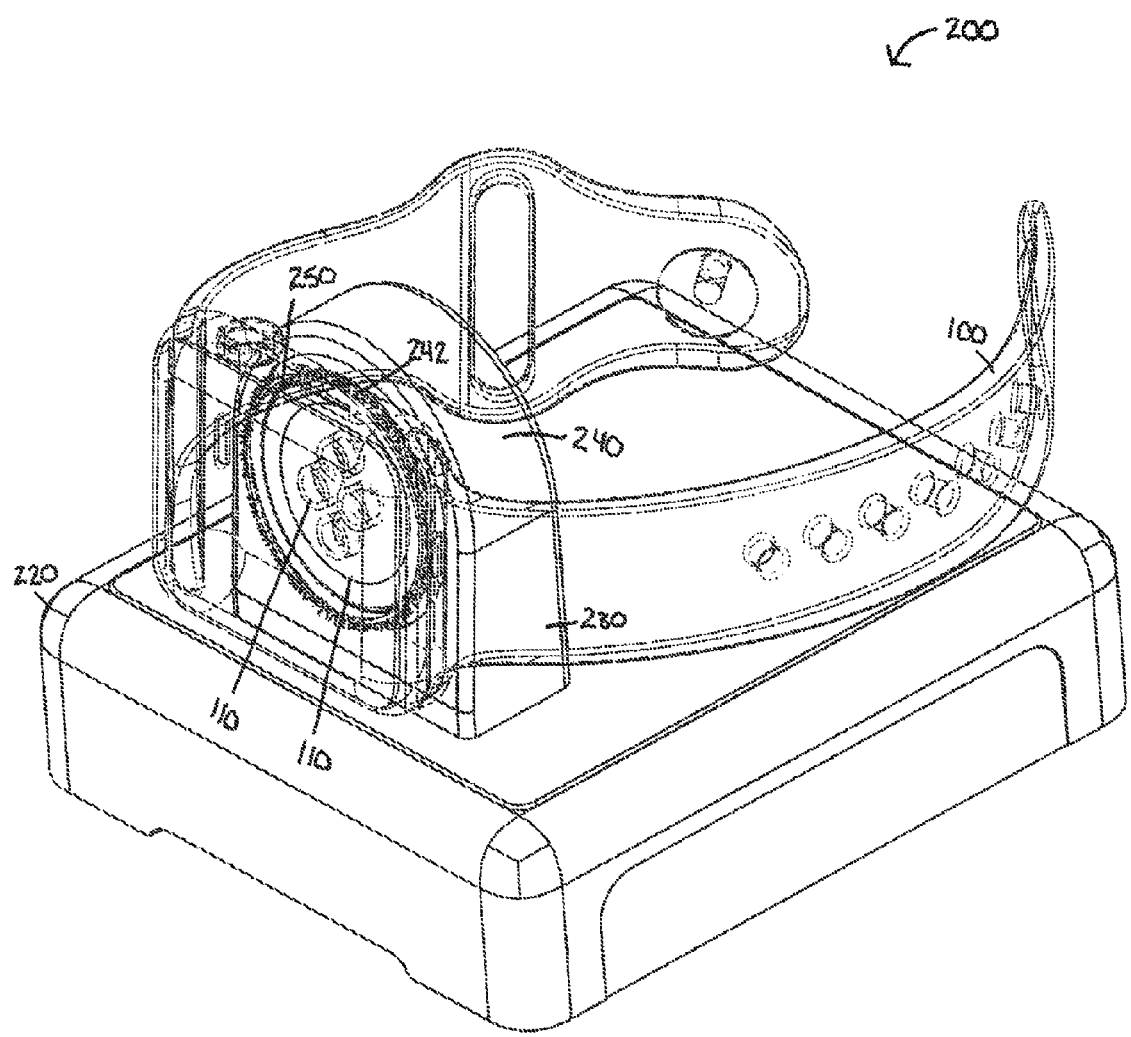
FIG. 12 is a perspective view of the device illustrated in FIG. 7 holding an electronic device which is displayed in broken lines.
Figure 13:
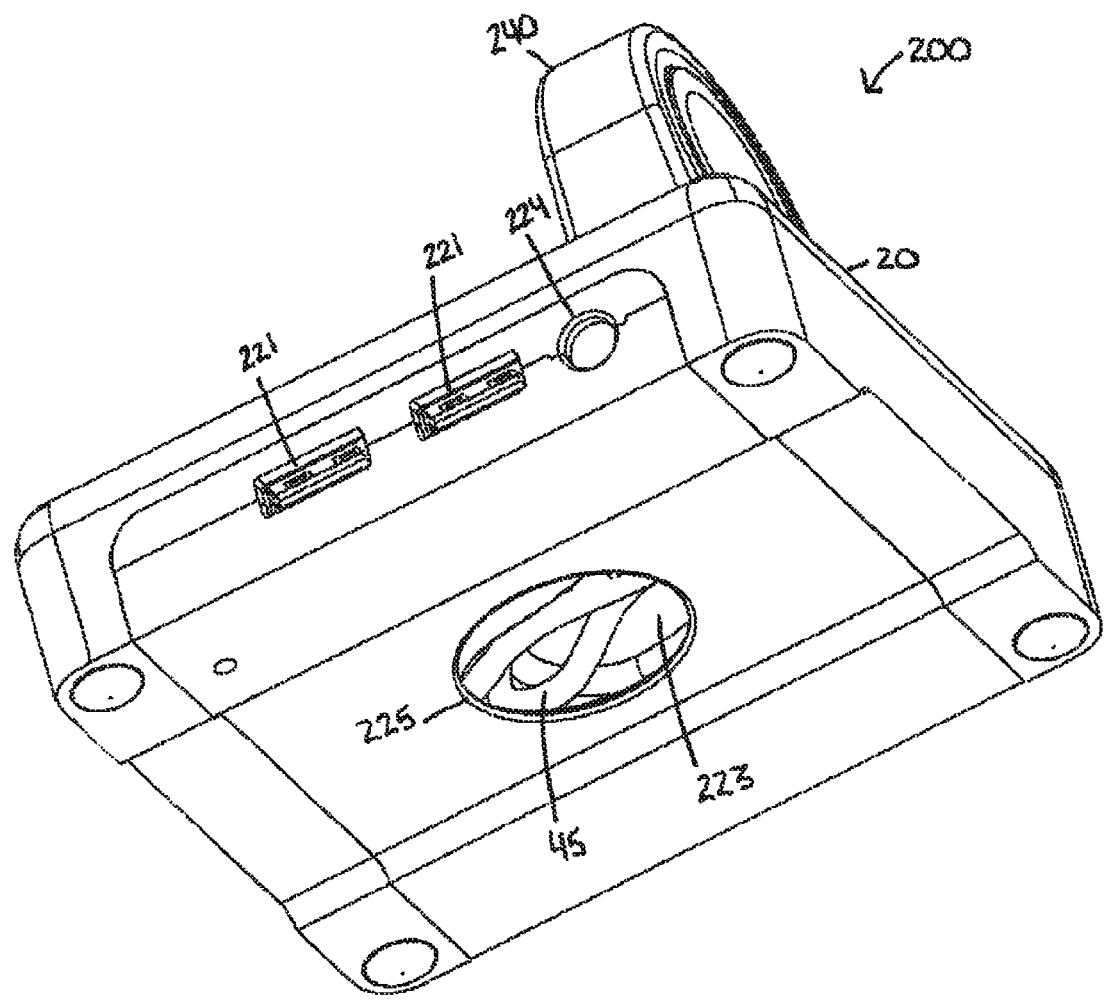
FIG. 13 is a bottom view of the device illustrated in FIG. 7.

The power system 10 includes a base 20, a vertical portion 30, and a top member 40. The vertical portion 30 can be integral to the base 20. As best shown in FIG. 4, the base 20 includes a charging module 22 that as will be described, is in electrical communication with a transmitter part 50 (best shown in broken lines in FIG. 2) releaseably disposed in the top member 40. More particularly, the transmitter part 50 is received within a sized cavity 42 disposed in the uppermost surface of the top member 40. The cavity 42 (like the transmitter part 50) generally having a circular configuration.

The power system 10 further includes a wiring 45 that is releaseably disposed along a path 35, which path 35 serves as part of a cable management system that extends from the top member 40 to the base 20. More particularly, the path 35 extends from the cavity 42 across the top member 40, down the vertical portion 30, through the base 20 and electrically connected to the charging module 22. The transmitter part 50 is snugged into place in the cavity 42 with a magnet (not shown) and again, is connected to the wiring 45 that is in electrically connected to the charging module 22.

In application, the electronic device 100 includes a receiver (not shown) configured such that when the receiver is in communication with the transmitter port 50 as shown in FIG. 1, the receiver is then in electrical communication with the charging module 22, thereby charging the device.

The base 20 of the power system includes additional connectors 21 (external connectors), and internal wire storing portion 23, and access 24 to an external power source (not shown). The power system is an example of an intervening device that intervenes between the electronic device 100, as well as a second or additional electronic devices or the like (not shown).

In the present embodiment, as illustrated in FIG. 1, the electronic device 100 is an Apple® Watch, however, other electronic devices having similar embodiments of the Apple® Watch, and the like, can be used.

The top member 40 generally defines a first portion 46 and a second portion 49. The first portion 46 is preferably integral to the vertical portion 30, and the second portion 49 having the cavity portion 42 as previously described. As best illustrated in FIG. 4, the first portion 46 includes a hollow pin member 47 that extends horizontally from an end 46a of the first portion 46. The extending pin member 47 is parallel to a longitudinal axis 5 (see FIG. 4) of the top member 40. The pin member 47 has a distal end 47a that is sized and shaped to be received within a bore 48 having an opening 48a disposed on an end 49a of the second portion 49. The pin member 47 is configured to be received with the bore 48 such that the second portion 49 can be rotated about the pin member 47 of the first portion 46. In application, the wire 45 extends from the cavity 42 through the hollow pin member 47 and down the vertical portion 30 as described. The second portion 49 is configured to rotate through a 360-degree angle. As the second portion 49 is rotatably positioned as described, the electronic device 100 can be rotatably positioned with the second portion 49.

In application, it is critical that the wiring 45 is inserted within the path 35 as the first portion 46 and second portion 49 are both parallel with axis 5. The wiring 45 will then twist in the same axis as the second portion 49 rotates as described. The cavity portion 42 is manufactured from a metal material. Preferably, the metal material is aluminum.

In application, the electronic device 100 is positioned on the second portion 49 (as illustrated in FIG. 1) such that a receiver on the electronic device (not shown) is in appropriate communication with the transmitter part 50 disposed in the cavity 42. In this position, an electric current in the transmitter portion creates a magnetic field that induces an electric current in the receiver of the electronic device thereby charging the device 100. The charging of the electronic device's battery occurs with current flowing into the battery through the battery contacts from the electronic device. As should be understood, the actual charging is handled by the transmitter portion 50 being in contact with the receiver/battery contacts of the electronic device.

Referring to FIGS. 7-13, an inductive charging station or power system 200 according to an alternate embodiment is shown. The power system 200 generally including a transmitter part for connecting an electronic device 100 thereto, for charging the batteries of the electronic device 100 and/or to run the electronic device 100.

As illustrated, the power system 200 according to the present embodiment supports the electronic device 100 during application. In other words, the power system 200 is an example of a supporting device, a holding device, a supporting stand, a support, a setting stand, and a holder for the electronic device 100.

The power system 200 includes a base 220, an integral vertical portion 230, and a top member 240. The base 220 includes a charging module 222 that as will be described, is in electrical communication with a transmitter part 250 releaseably disposed in the top member 240. More particularly, the transmitter part 250 is received within a sized cavity 242 disposed in the outer surface of the top member 240. Preferably, the cavity portion 242 is manufactured from a metal material, and preferably the metal material is aluminum.

The power system 200 includes the charging module 222 configured for connection with the transmitter part 250. In particular, the transmitter part 250 is snugged into place in the cavity 242 and is releaseably connected 23 with the charging module 222.

As illustrated, the vertical portion 230 and top member 240 are substantially perpendicular to a length (designated as "L" in FIG. 11) on the base 220.

In application, the electronic device 100 includes a receiver 110 configured such that when the receiver 110 is in appropriate communication with the transmitter part 250, the receiver 110 is then in electrical communication with the charging module 222, thereby charging the device 100.

In application, the electronic device 100 is positioned with the top member 240 such that the receiver 110 is in communication with the transmitter part 250 disposed in the cavity 242. In this position, an electronic current in the transmitter portion creates a magnetic field that induces an electric current in the receiver of the electronic device thereby charging the device 100. The charging of the electronic device's battery occurs with current flowing into the battery through the battery contacts from the electronic device. As should be understood, the actual charging is handled by the transmitter portion 250 being in contact with the receiver/battery contacts of the electronic device.

The base 220 of the power system includes additional connectors 221 (external connectors) and access 224 to an external power source (not shown), and internal wire storing portion 223 for storing wire 45, and access 225 to the storing portion 223. In other words, the power system is an example of an intervening device that intervenes between the electronic device 200 as well as a second or additional electronic devices or the like (not shown).

As illustrated, the electronic device 100 is an Apple® Watch, however, other electronic devices having similar embodiments, namely a receiver 110 for charging the device as disclosed, can be used.

Although the above description contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. An inductive charging station comprising:
a base, a vertical portion, and a top member that includes a cavity, said base includes a charging module for electrical communication with a transmitter used for charging an electronic device, wherein the transmitter includes a wiring configured for electrically connecting to said charging module,
a path that extends from the cavity to said charging module,
said top member defines a first portion and second portion that includes said cavity, and wherein said first portion includes a pin member that extends horizontally from an end of the first portion and having a distal end configured to be received within a bore disposed on an end of the second portion such that the second portion can be rotated about the pin member,
wherein said cavity is sized for receiving the transmitter such that the electronic device is positioned on the top member so that the electronic device's receiver is in electrical communication with the transmitter, and
wherein said cavity is manufactured from a metal material.

2. The inductive charging station as recited in claim 1, wherein said cavity is disposed in an upper surface of the top member.

3. The inductive charging station as recited in claim 2, wherein said cavity having a circular configuration.

4. The inductive charging station as recited in claim 3, wherein said base includes at least one external power connector.

5. The inductive charging station as recited in claim 3, wherein said base includes an internal wire storing portion.

6. The inductive charging station as recited in claim 3, wherein said first portion is integral to said vertical portion.

7. The inductive charging station as recited in claim 3, wherein said extending pin member is parallel to a longitudinal axis.

8. The inductive charging station as recited in claim 7, wherein said second portion is configured to rotate through a 360-degree angle.

9. The inductive charging station as recited in claim 8, wherein said metal material is aluminum.

10. An inductive charging station comprising:
a base, a vertical portion, and a top member that includes a cavity, said base includes a charging connection for electrically connecting with a transmitter used for charging an electronic device, wherein said cavity is sized for receiving the transmitter so that the electronic device's receiver is in electrical communication with the transmitter, and wherein the vertical portion and top member are perpendicular to a length of the base member, and said cavity is in communication with said charging connection and said cavity is manufactured from a metal material.

11. The inductive charging station as recited in claim 10, wherein said cavity having a circular configuration.

12. The inductive charging station as recited in claim 11, wherein said metal material is aluminum.

* * * * *